United States Patent [19]

Hora

[11] 4,363,562

[45] Dec. 14, 1982

[54] BLOCKING-TYPE KEY

[75] Inventor: Richard E. Hora, Riverside, Calif.

[73] Assignee: FMC Corporation, Chicago, Ill.

[21] Appl. No.: 282,556

[22] Filed: Jul. 13, 1981

[51] Int. Cl.³ .............................................. F16B 3/00
[52] U.S. Cl. ..................................... 403/318; 403/358
[58] Field of Search ................ 403/356, 358, 318, 319

[56] References Cited

U.S. PATENT DOCUMENTS

| 1,612,769 | 12/1926 | O'Connell | 403/356 X |
| 2,588,064 | 3/1952 | Webb | 403/358 |
| 3,014,332 | 12/1961 | Hubbard | 403/356 X |

FOREIGN PATENT DOCUMENTS

| 2203765 | 8/1973 | Fed. Rep. of Germany | 403/356 |
| 480863 | 11/1975 | U.S.S.R. | 403/356 |

Primary Examiner—Andrew V. Kundrat
Attorney, Agent, or Firm—H. M. Stanley; R. B. Megley

[57] ABSTRACT

A key that is in operative engagement between a keyway in a vertical shaft and a keyway in a driven member, such as the hub of a sprocket, is bent at its lower end to prevent the drive member from sliding downwardly out of engagement with the key.

1 Claim, 1 Drawing Figure

U.S. Patent   Dec. 14, 1982   4,363,562
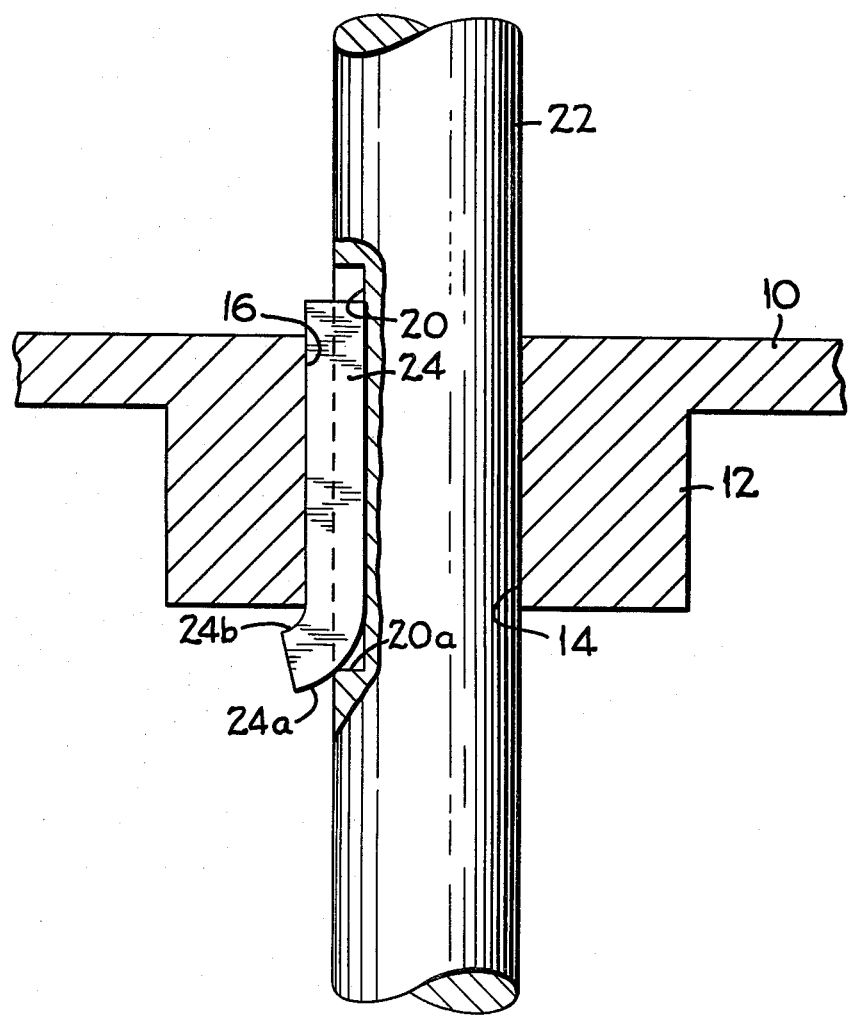

BLOCKING-TYPE KEY

BACKGROUND OF THE INVENTION

Sprockets, discs, wheels and similar members, that are mounted on a vertical shaft and are driven by means of a key that is disposed in the keyway defined jointly by a keyway in the shaft and a keyway in the member itself, have a tendency to slide downwardly on the key and move out of engagement therewith.

It is an object of the present invention to provide apparatus for preventing a driven member on a vertical shaft from inadvertently moving downwardly out of engagement with the shaft.

SUMMARY OF THE INVENTION

A key that is disposed in operative engagement in a keyway between a vertical shaft and a member driven by the shaft through the key, is deformed at its lower end to provide a portion disposed in the path of downward movement of the member to stop such movement.

DESCRIPTION OF THE DRAWINGS

The single FIGURE of the drawings is a fragmentary section through the hub of a member disposed on a vertical shaft.

In the drawing the reference numeral 10 indicates a disc having a cylindrical hub 12.

The hub 12 has a central cylindrical passage 14 provided with a keyway 16 extending the entire length of the hub. The keyway 16 is rectangular in cross-section and cooperates with a similar keyway 20 in a vertical shaft 22 to provide a combined keyway of square cross-section. The keyway 20 in the shaft is provided with an abutment wall 20a at its lower end. A key 24, which is also of square cross-section, is dimensioned to fit in the keyways. At its lower end, the key 24 is bent to provide a convex surface 24a and a concave surface 24b.

When the disc is installed on the vertical shaft and the key 24 is in place, the disc has a tendency to move downward on the shaft and bring the lower end of the hub into contact with the concave surface 24b of the key. As a result, the key 24 is urged downwardly in the portion of the keyway that is in the shaft until the convex surface 24a of the key engages the abutment wall 20a of the keyway 20. This, of course, arrests the downward movement and prevents further movement in that direction.

While a disc having a hub in driven engagement with a shaft has been illustrated, it will be appreciated that any member which has a central portion driven through a key by a vertical shaft can be held in place by apparatus of the present invention. Examples of such other members are all members having bushings or bearings pressed in or secured in a central opening of the member and keyed to a vertical shaft.

It will be understood that, in a vertically-disposed shaft, the keyway 20 shaft must have an abutment wall 20a and therefore an open-ended keyway in such a shaft is not contemplated in this invention. However, the abutment wall need not be in a plane at right angles to the axis of the shaft since a wall that has a different contour, such as a concave configuration, will also restrict the axial movement of the key.

Also, while the present key and keyway arrangement has particular utility when the shaft is vertical or inclined to the horizontal, it will function for the intended purpose when the shaft is a horizontal shaft.

Although the best mode contemplated for carrying out the present invention has been herein shown and described, it will be apparent that modification and variation may be made without departing from what is regarded to be the subject matter of the invention.

What is claimed is:

1. A rotational driving assembly, comprising
    a shaft of uniform diameter having a rotational axis substantially vertical and having a first keyway therein of constant rectangular cross section,
    a disc member including a hub at one end to be driven and having a second keyway therein with a constant cross section similar to said first keyway and being formed to receive said shaft with said keyways in facing relationship,
    a key having a substantially constant rectangular cross section dimensioned to fit within both said first and second keyways when in said facing relationship,
    an abutment wall at the lower end of said first keyway,
    and an outwardly curved length on said key at the lower end thereof for engagement with said abutment wall and an end of said disc member when disposed within said keyways, whereby said disc member is secured both rotationally and supported axially in place on said shaft.

* * * * *